United States Patent [19]
Williams

[11] Patent Number: 5,894,996
[45] Date of Patent: Apr. 20, 1999

[54] METHOD AND APPARATUS FOR RECLAIMING PLASTIC

[75] Inventor: John D. Williams, Webster, Tex.

[73] Assignee: Empak, Inc., Chanhassen, Minn.

[21] Appl. No.: 08/910,145

[22] Filed: Aug. 13, 1997

[51] Int. Cl.$^6$ .................. B03B 9/00; B02C 1/00
[52] U.S. Cl. .......... 241/20; 241/21; 241/24.28; 241/79.1; 209/172; 209/172.5; 209/173
[58] Field of Search ............... 241/24.18, 24.28, 241/20, 79.1, 21; 209/172, 172.5, 173

[56] References Cited

U.S. PATENT DOCUMENTS

| | | | |
|---|---|---|---|
| 4,073,661 | 2/1978 | Buzga et al. | 134/1 |
| 4,162,880 | 7/1979 | Cobbs, Jr. et al. | 425/202 |
| 4,809,854 | 3/1989 | Tomaszek | 209/3 |
| 4,830,188 | 5/1989 | Hannigan et al. | 209/3 |
| 4,940,187 | 7/1990 | Lee | 241/79.1 |
| 5,022,892 | 6/1991 | Klima et al. | 44/621 |
| 5,104,047 | 4/1992 | Simmons | 241/20 |
| 5,277,758 | 1/1994 | Brooks et al. | 162/4 |
| 5,358,119 | 10/1994 | Stahl et al. | 209/3.1 |
| 5,397,066 | 3/1995 | Leitman et al. | 241/19 |

*Primary Examiner*—Joseph J. Hail, III
*Assistant Examiner*—William Hong
*Attorney, Agent, or Firm*—Nikolai, Mersereau & Dietz, P.A.

[57] ABSTRACT

A method and apparatus for reclaiming component plastics from a mixture of plastics wherein differentials in specific gravity serves as the segregation mechanism. The method includes the steps of: (1) fragmenting the plastic articles such that the resulting plastic fragments are generally of a preferred dimension and contain primarily one such component plastic; (2) sizing the fragmented plastic so as to remove plastic fragments which do not comport to the preferred dimensions; (3) adding a fluid medium to the plastic fragments to produce a slurry; (4) loosening contamination from the plastic fragments; (5) segregating the heavy and light components within the slurry based on specific gravity; (6) isolating the segregated plastic fragments; and (7) cleaning the heavy and light components to produce high purity plastic. The step of segregating is accomplished via an improved segregation vessel which performs specific gravity segregation by reducing the gross linear vertical flow rate of fluid medium through the cooperative action of specifically designed baffle members and the vessel shape. An improved segregation chamber is provided having a pair of semi-permeable members which cooperate to define a separation zone and a segregation zone such that vapor and fluid medium is allowed to flow into the separation zone while the plastic fragments are generally restricted within the segregation zone and the segregation zone serves to reduce the gross linear vertical flow rate of fluid medium toward the outlets.

11 Claims, 4 Drawing Sheets

METHOD AND APPARATUS FOR RECLAIMING PLASTIC

BACKGROUND OF THE INVENTION

I. Field of the Invention

The present invention relates generally to reclaiming plastic during recycling operations. More particularly, the present invention relates to a method and apparatus for reclaiming component plastics from a mixture of plastics wherein differentials in specific gravity serves as the segregation mechanism.

II. Discussion of the Prior Art

Through time, plastics have enjoyed increasing popularity in forming articles of manufacture. This popularity, however, has given rise to a mounting environmental concern with regard to disposing the plastic articles after use. The resilient nature of plastic presents complications in that most plastics do not readily degrade in traditional waste disposal facilities, such as landfills, thereby creating the potential for future environmental hazards. The disenchantment with traditional waste disposal facilities has therefore prompted a host of activity in the area of plastic recycling and reclamation with the goal of providing reclaimed plastic for subsequent re-use so as to increase the effective lifespan of the plastics while decreasing the overall influx of plastics into traditional waste disposal sites.

U.S. Pat. No. 5,397,066 to Leitman et al. discloses one such attempt at reclaiming plastic for subsequent use. The process begins with a step of providing a mixture of two different plastics in the form of particles, inducing electrostatic charges on the particles of said mixture, and then introducing the mixture in the form of charged particles into a vertical fluidized bed column having an upwardly flowing gaseous stream therein. A fluidized bed column is provided designed so that a relatively low density fraction of the mixture consisting of a first plastic exits the upper end of the column, and a relatively high density fraction of the mixture consisting of a second plastic exists the lower end of the column. Another step involves charging the column with a polarity opposite that of the charge of the second plastic for attracting to the column the particles of the second plastic which are of relatively high density.

U.S. Pat. No. 5,358,119 to Stahl et al. discloses yet another technique for plastic reclamation. The Stahl process utilizes density separation, a special surface treatment, and electrostatic separation to split up plastic mixtures into individual components. The plastics in the mixture are first ground into small plastic particles. The particles are then separated based upon their density. This is accomplished by placing the materials in a separation liquid which is selected so that the density of the liquid is between the greatest density and smallest density of the individual plastics. Once this separation is complete, each group of plastics separated in the density separation step are dried, injected into a fluidized bed and fed into an electrostatic freefall separator.

U.S. Pat. No. 5,227,758 to Brooks et al. sets forth a method for separating plastic coatings from paper labels or the like. The initial step involves introducing the plastic coated waste into a size reduction unit and reducing the plastic coated waste to particles having a maximum dimension range between about 1 inch and about 4 inches. Next, the plastic coated waste is mechanically hammered and rubbed in an effort to separate a portion of the paper from the plastic. The plastic is then floated in a slurry and agitated in an effort to separate still more of the paper from the plastic. The resulting plastic particles are further reduced in size to about ½ inch and then dried.

U.S. Pat. No. 5,115,987 to Mithal illustrates a technique for the separation of plastic beverage bottle components. The first step involves cutting the plastic bottle into two halves and then collecting the bisected bottle halves onto a moving take away conveyor. The bisected bottle halves are then subjected to a thermal treatment to soften the adhesives joining the beverage bottle components. The thermally softened bottle components are then set into a scrambler having an agitating means whereby the bottle components are mutually isolated and disjoined from each other. The disjoined components are then placed into a floatation tank whereupon the labels and high density polyethylene portions float while the polyethylene terephthalate components sink. The floating and sunken components are collected separately. Mechanical screening is then instituted to separate the plastic components from aluminum or other potential contaminants. The high density plastic components are subjected to air classification to separate the labels from the plastic.

U.S. Pat. No. 5,183,212 to Boo et al. discloses a method for separating a multi-layer plastic article into components. The method described in the patent in its most basic form is very simple, involving the steps of dividing the multi-layer plastic into small particles, agitating the particles and then separating one type of particles from the other type of plastic particles. This separation is achieved by flotation or through use of a centrifuge.

U.S. Pat. No. 5,104,047 to Simmons sets forth a waste treatment system which includes a waste receiving means, and a separating means for separating higher density material from lower density material. Each material can be subjected to a hammermill to produce an output of liquid slurry. The hammermill deposits the slurry in an elevator which dumps the slurry into a centrifuge to provide final separation of waste material from the slurry.

U.S. Pat. No. 4,830,188 to Hannigan et al. demonstrates yet another system for recycling plastic bottles. The first step in this process is to grind the bottles into mixed plastic flakes. The plastic flakes are then subjected to a wash liquid including a surfactant. The flakes are then placed in a liquid separator. High density flakes will sink to the bottom of the flotation liquid while the lower density flakes will tend to the float to the top. The role of the surfactant is to substantially reduce the surface tension of the liquid to assist in this separation based upon density.

U.S. Pat. No. 4,162,880 to Cobbs, Jr. et al. discloses a plastic scrap recovery apparatus which includes a hopper for receiving articles containing plastic material to be recovered, a cutter for breaking articles into chips, separating the chips into discrete component plastic materials, separating non-plastic components from the chips, conveying the chips and non-plastic components from the separator, melting a selected one of the discrete plastic component materials and pelletizing the discrete plastic component materials.

U.S. Pat. No. 4,809,854 to Tomaszek illustrates a system for reclaiming reusable resin materials from scrap articles. This system requires that scrap articles comprise at least one component formed of a first resin having a low density and a second component formed of a second resin having a higher density. The system described in Tomaszek includes a first flotation apparatus and a second floatation apparatus. The scrap particles are granulated and floatation separated in two successive stages.

U.S. Pat. No. 4,073,661 to Buzga et al. sets forth still another process for cleaning and preparing recycled plastics.

First, foreign objects are removed from the plastic. The plastic is then fed into a washing solution having a greater specific weight than the plastic material. The washing solution and the plastic material therein are then subjected to a turbulent area and then advanced into a turbulent-free zone containing washing solution. The plastic is next removed from the turbulent free zone and dried.

The foregoing references address various problems associated with reclaiming plastics. However, notwithstanding this flurry of activity, the aforementioned references nonetheless suffer from a host of significant disadvantages. A need therefore exists for an improved method and apparatus for reclaiming component plastics.

SUMMARY OF THE INVENTION

The first step in the method of the present invention involves grinding the plastic into fragments such that each fragment contains primarily one component plastic. The component plastics may include one or more light components and one or more heavy components such that the light components have a specific gravity less than that of each of the heavy components. The plastic fragments are then transported to a sizing device so that only fragments of the appropriate size continue through the process. The mixture of properly sized plastic fragments may contain very small fragments or fines which may not be removed by the sizing device. The fines, for example, may avoid separation from the plastic fragments of the desired dimension through static attraction. These fines may be removed through aspiration, washing, or a similar separation method either before or after sizing. Thereafter, the plastic fragments of the desired dimensions are combined with a fluid medium to produce a slurry. The fluid medium should preferably be chosen such that it has a specific gravity greater than that of the each of the light components and less than that of each of the heavy components. The specific gravity of the fluid medium may be adjusted as necessary using dissolved or soluablized additives such as salt or alcohol. A surfactant may also be added to the fluid medium to decrease the surface tension of the medium.

The next step involves treating the plastic fragments to loosen any contaminants, such as dirt, adhesives, paint, or other substances which are attached to or embedded in the surface of the plastic fragments. In a preferred embodiment, this may be accomplished by heating the fluid medium and agitating the slurry via mechanical means and/or ultrasonic energy. Excess fluid medium may be removed from the slurry through a screen, filter, or other separation method. After the contamination has been loosened from the plastic fragments, the slurry may be fed into a segregation vessel. The purpose of the vessel is primarily to exploit the differing specific gravities of the component plastics such that plastic fragments of the light components will rise to the top of the segregation vessel while fragments of the heavy components will tend to fall to the bottom of the segregation vessel. A secondary purpose of the segregation vessel may be to remove any entrained vapor contained in the slurry, as well as dislodge any vapor bubbles adhering to the individual plastic fragments. The segregation vessel should provide a separation zone and a vapor head space. Upon segregation of the plastic fragments, the concentrated light components may be removed through the upper outlet of the segregation vessel along with the vapor. The concentrated heavy components may be removed through the lower outlet of the segregation vessel.

Removal of the fluid medium and contaminants from component plastics may be accomplished in a variety of manners including, but not limited to, screening, filtration, oxidation, extraction, evaporation and aspiration. A wash spray may also be incorporated to further aid in removal of the contaminants. Plastics can also be subjected to a leaching or degassing mechanism. Ultra pure, high ohm heated DI water has been shown to be particularly useful in reducing levels of chloride or other ionic contaminants from the plastic fragments. Using this as the fluid medium and increasing the residence time in the fluid medium may tend to improve the leaching and degassing mechanism.

The foregoing features and advantages of the present invention will be readily apparent to those skilled in the art from a review of the following detailed description of the preferred embodiment in conjunction with the accompanying drawings and claims.

DETAILED DESCRIPTION OF THE PREFERRED EMBODIMENT

The present invention involves both a method and apparatus for reclaiming component plastics from a mixture of plastics having differing specific gravities. The plastic articles may be of any nature including, but not limited to, blow molded, injection molded and extruded articles, and may be constructed of one or more component plastics. The component plastics may include one or more light components and one or more heavy components such that each of the light components has a specific gravity less than that of each of the heavy components.

Figure 1:
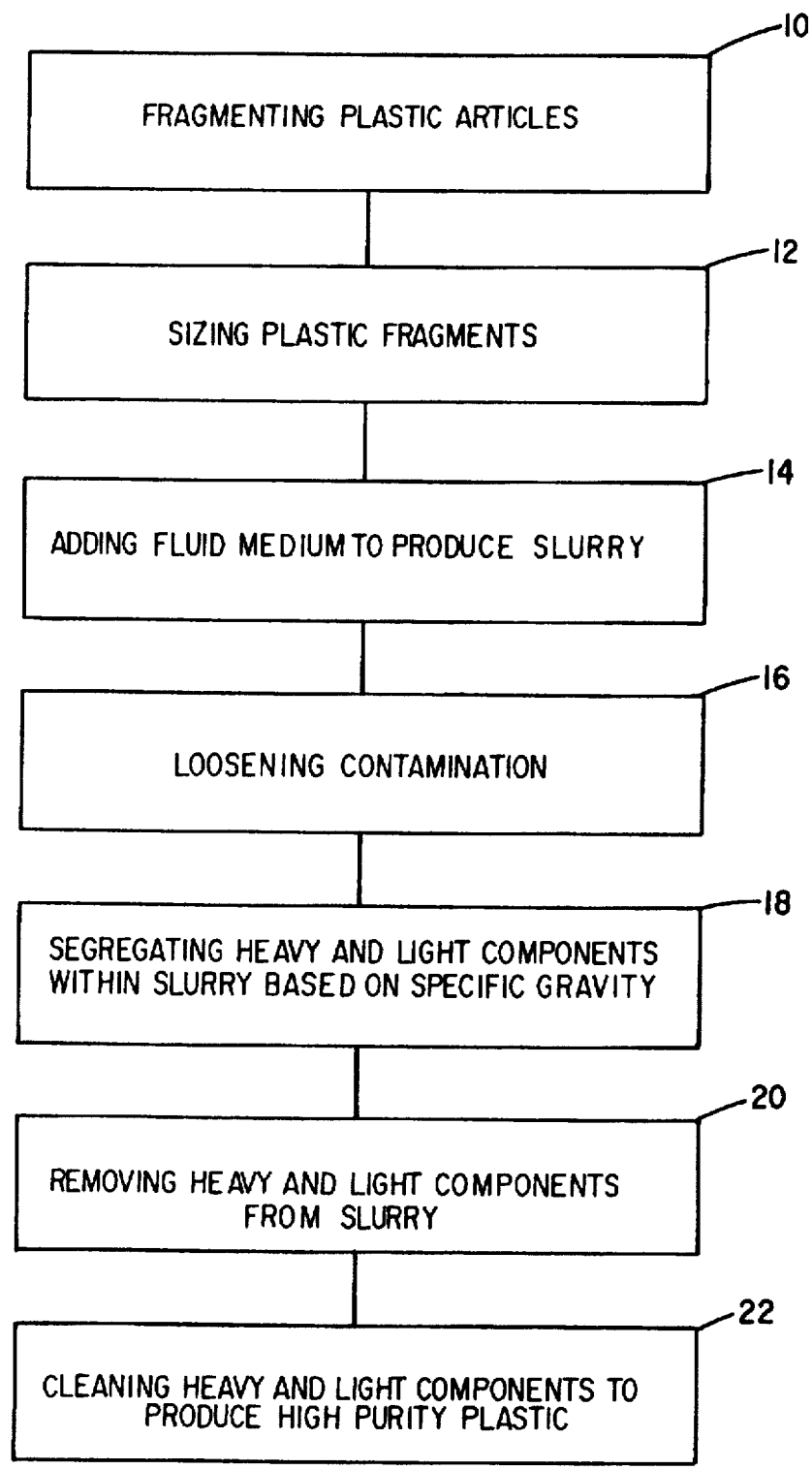
FIG. 1 is a flow chart illustrating the method steps for reclaiming component plastic from a mixture of plastics in accordance with a preferred embodiment of the present invention.

With reference first to FIG. 1, the method steps of the present invention are as follows. The first step 10 involves fragmenting the plastic articles such that the resulting plastic fragments are generally of a preferred dimension and contain primarily one such component plastic. The next step 12 involves sizing the fragmented plastic so as to remove plastic fragments which do not comport to the preferred dimensions. In a preferred embodiment, the step 12 of sizing may include the further sub-step of removing fines which, as will be explained in greater detail below, are fragments substantially smaller than the preferred dimension. The plastic fragments of the desired dimensions are thereafter combined with a fluid medium in step 14 to produce a slurry. The next step 16 involves the loosening of contamination from the plastic fragments, wherein the contamination may include dirt, adhesive, paint or other substance or material attached to or imbedded in the surface of the plastic fragments. The slurry is then segregated in step 18 based on the specific gravity of the plastic fragments such that the light and heavy components migrate away from one another. The concentrated light components and concentrated heavy components are thereafter removed in separation from the slurry in step 20. The final step 22 involves cleaning the heavy and light components to produce high purity plastic which, in a preferred embodiment, may include the further sub-steps of washing, drying, and aspirating the heavy and light components. The foregoing method advantageously cleans and segregates component plastics for re-use boasting purities of 96% or better for light components and 99% or better for heavy components.

With regard to steps 10 and 12, the preferred dimension of the plastic fragments may vary depending upon the application. The preferred dimension may be defined in terms of a maximum nominal dimension. For example, in a preferred embodiment the plastic articles may be ground such that a majority of the fragments are of a size less than a maximum nominal dimension of about 1.5 inches or, in other words, having dimensions such that the fragments are likely to pass through a screen or other sizing device having orifices of about 1.5 inches. More preferably still, the fragmentation step 10 may be conducted such that a majority of the fragments are of a size less than a maximum nominal dimension of about 0.625 inches. The preferred dimension may also be defined in terms of a minimum nominal dimension. Under this convention, the plastic fragmentation may be conducted such that a majority of the resulting plastic fragments are of size greater than a minimum nominal dimension of about 3/32 inches, i.e. having dimensions such that fragments are not likely to pass through a screen or other sizing device having orifices of about 3/32 inches. In a further preferred embodiment, a majority of the fragments should be of a size greater than a minimum nominal dimension of about ½ inches. Plastic fragments of a size in excess of the maximum nominal dimension may be reground prior to further processing to allow more efficient processing. Plastic fragments of a size smaller than the minimum nominal dimension may be discarded or otherwise removed from the preferred process to allow more efficient processing.

As noted above, in a preferred embodiment the step 12 of sizing the plastic fragments includes the further sub-step of removing fines from the plastic fragments. Fines are generally undesirable in the process of reclaiming plastic and may avoid separation from the mixture of plastic fragments despite having a nominal dimension below the desired minimum through static attraction or otherwise. The removal of such fines may be accomplished in any of a variety of fashions, including but not limited to aspiration, washing, or similar methods of separation either before or after sizing. In the slurry formation of step 14, the fluid medium should be chosen such that its specific gravity is greater than that of each of the light components and less than that of each of the heavy components. For ease of processing, the fluid medium may preferably be water, although other fluids may also be suitable. The specific gravity of the fluid medium may be adjusted as necessary using dissolved or solubilized additives. In the case of water, salt or alcohol, as examples, could be added to raise or lower the specific gravity respectively. The specific gravity of the fluid medium also may be adjusted through temperature regulation.

The step 16 of loosening contamination from the plastic fragments may be accomplished in any number of different ways. For example, the fluid medium and/or slurry may be heated to a temperature conducive to loosening any contamination from the plastic fragments. The fluid medium may be heated prior to combination with the plastic fragments, or heat may be input to the slurry itself regardless of whether the fluid medium has been preheated. By way of example and not limitation, contamination in the form of adhesive may be attached to the plastic fragments. In order to loosen such adhesive, the fluid medium and/or slurry may be heated to a temperature higher than the softening temperature of the adhesive such that the adhesive may be readily removed from the plastic fragments. The maximum temperature, and the exposure time of the plastic fragments to such maximum temperature, should be chosen to avoid softening any of the plastic fragments to the point where the fragments might begin to agglomerate. It should be noted that the maximum temperature of the slurry may be higher than the lowest softening point of the individual plastic components provided the residence time is sufficiently short to avoid agglomeration.

Contamination may also be loosened by physically agitating the slurry. Such agitation may be induced in one or more ways, separately or in combination. For example, agitation can be induced through movable blades or paddles, sonic energy, ultrasonic energy; splitting and impacting slurry streams, or any other mechanical or non-mechanical method of mixing or agitation known in the art of solids and fluid processing. To still further improve loosening of contamination, the aforementioned various agitation methods may be used in combination or in sequence. In a preferred embodiment, it is preferable to utilize both mechanical agitation and ultrasonic agitation in series. Mechanical agitation may be provided by any motionless mixer commonly found in industry and compatible with slurry flow. The motionless mixer should be sized to split and impact the slurry stream upon itself a sufficient number of times to loosen gross contamination from the plastic fragments. Ultrasonic agitation may be provided in the preferred embodiment by any ultrasonic horn capable of imparting sonic energy to the slurry flow at a frequency of about 35 to 45 kHz and an energy level sufficient to loosen substantially all remaining contamination from the plastic fragments. The agitation system may be constructed in any number of different sizes to accommodate various types and amounts of contamination.

Excess fluid medium may be removed from the slurry through a screen, filter or other separation method. Removal of excess fluid medium, and the resulting concentration of the slurry, may aid removal of contamination and segregation of component plastics. As an alternative, either the plastic fragments, the fluid medium or both may be metered into the system using any of a variety of commercially-available metering devices. Any resulting improvements may derive from the greater interaction of the plastic fragments within the slurry as well as the reduced flow rate of slurry through the system. The concentration of the slurry is preferably about 30% to 60% fluid medium by volume and, more preferably, about 45% to 55% fluid medium by volume. Higher or lower concentrations are certainly capable of functioning in the preferred invention. Utilizing concentrations beyond those described in the preferred invention will merely affect efficiencies.

Figure 2:
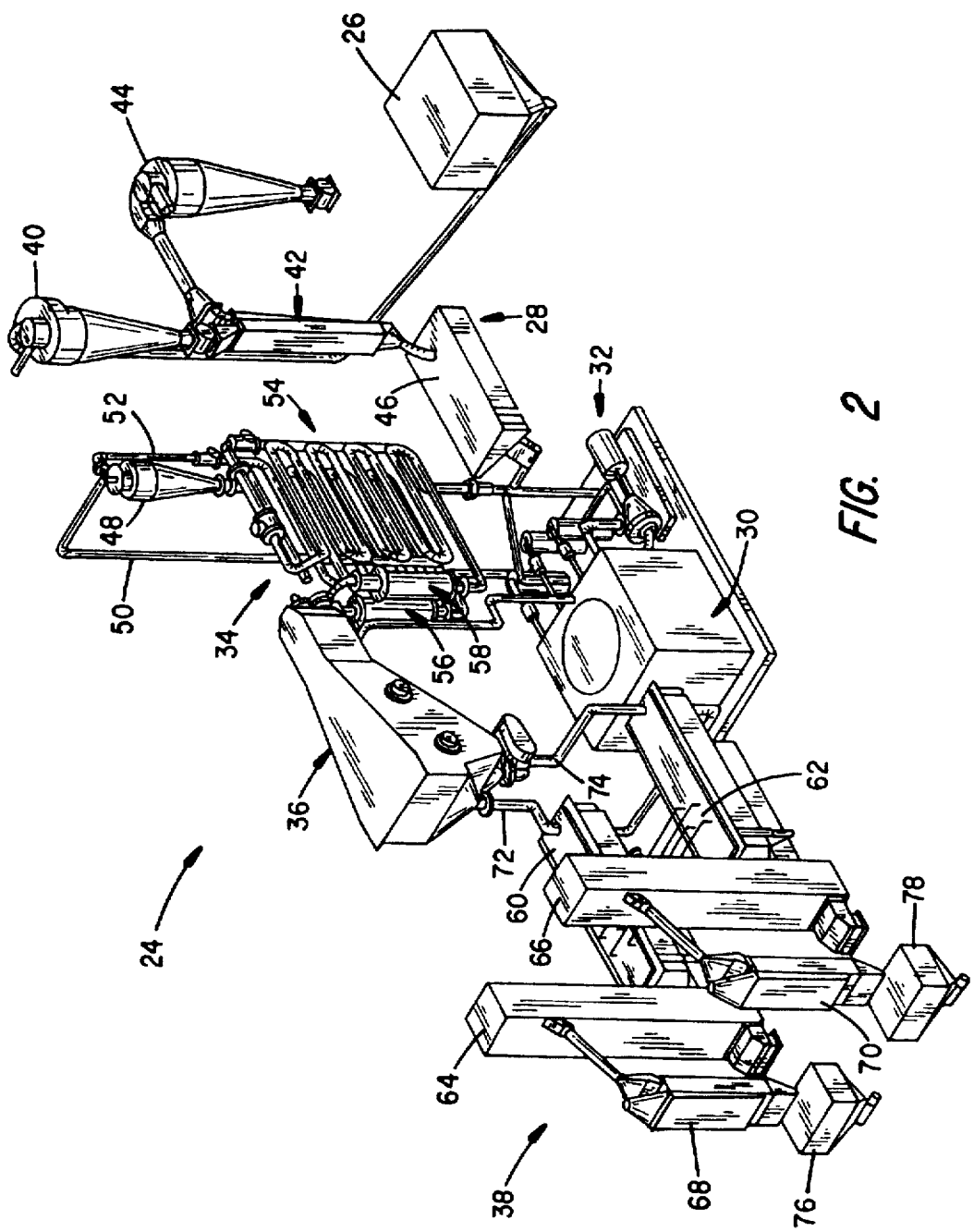
FIG. 2 is a perspective view of a plastic reclamation system 24 of the present invention for accomplishing the method set forth in FIG. 1.

With reference to FIG. 2, shown in perspective is a plastic reclamation system 24 provided in accordance with a preferred embodiment of the present invention capable of effectuating the foregoing method of the present invention. The plastic reclamation system 24 includes a hopper 26 for receiving fragmented plastic, a sizing assembly 28 for removing plastic fragments which do not comport with predetermined size limitations, a fluid reservoir 30 and pump assembly 32 for combining DI water with the sized plastic fragments to produce a slurry, a contamination loosening assembly 34 for loosening contamination from the slurry, a segregation vessel 36 for segregating the slurry based on the specific gravity of the plastic components, and a cleaning assembly 38 for cleaning the heavy and light plastic components from the segregation vessel 36 to produce high purity plastic. The sizing assembly 28 includes a first feed eductor 40 for transporting plastic fragments from the hopper 26 to a pre-aspirator 42, a second feed eductor 44 coupled to the pre-aspirator 42 for removing fines from the plastic fragments within the pre-aspirator 42, and a dual screen vibratory table 46 coupled to the pre-aspirator 42 for further separating out plastic fragments which do not fall within the range of preferred dimensions.

A third feed eductor 48 is coupled to the vibratory table 46 via a pipe 50 for transporting sized plastic fragments from the vibratory table 46 to the contamination loosening assembly 34. The third feed eductor 48 is also coupled to the pump assembly 32 via a pipe 52. The pump assembly 32 draws heated DI water from the fluid reservoir 30 and transports the heated DI water to the third feed eductor 48 via the pipe 52 to produce a slurry with the sized plastic fragments. In a preferred embodiment, the contamination loosening assembly 34 includes a switchback pipe assembly 54 for redirecting the slurry and a pair of sonic units 56, 58 for imparting sonic energy into the slurry. The slurry redirection accomplished via the switchback pipe assembly 54 effectively causes the plastic fragments within the slurry to impinge upon each other and/or the interior of the piping so as to loosen any contamination which may be adhering thereto. The sonic units 56, 58 further loosen contamination from the plastic fragments by imparting sonic energy at a preferred frequency of approximately 35 to 45 kHz.

After the continued loosening of contamination by the sonic units 56, 58, the slurry is transported into a segregation vessel 36. As will be described in greater detail below, the segregation vessel 36 is designed to separate the various component plastics within the slurry based on specific gravity such that the plastic fragments having lighter specific gravities will tend to rise to the top of the segregation vessel 36 while the plastic fragments having heavier specific gravities will tend to fall to the bottom of the segregation vessel 36. The segregation vessel 36 is coupled to the cleaning assembly 38 such that, following specific gravity segregation, the heavy and light component plastics may be thereafter cleaned to provide high purity reclaimed plastic. In a preferred embodiment, the cleaning assembly 38 includes a first rinse table 60, a second rinse table 62, a first drying assembly 64, a second drying assembly 66, a first air aspirator 68, and a second air aspirator 70. The first and second rinse tables 60, 62 are coupled to the segregation vessel 36 via pipes 72, 74, respectively, and serve to rinse the respective light and heavy component plastics with tepid ultra pure DI water. The light component plastics, after passing through the first rinse table 60, are transported into the first drying assembly 64 to remove the moisture from the plastic fragments. The heavy component plastics are similarly transported into the second drying assembly 66 after passing through the second rinse table 62 to remove the moisture from the plastic fragments. The light component plastics finally pass through the first air aspirator 68 for collection in a light component hopper 76, while the heavy component plastics pass through the second air aspirator 70 into a heavy component hopper 78.

Figure 3:
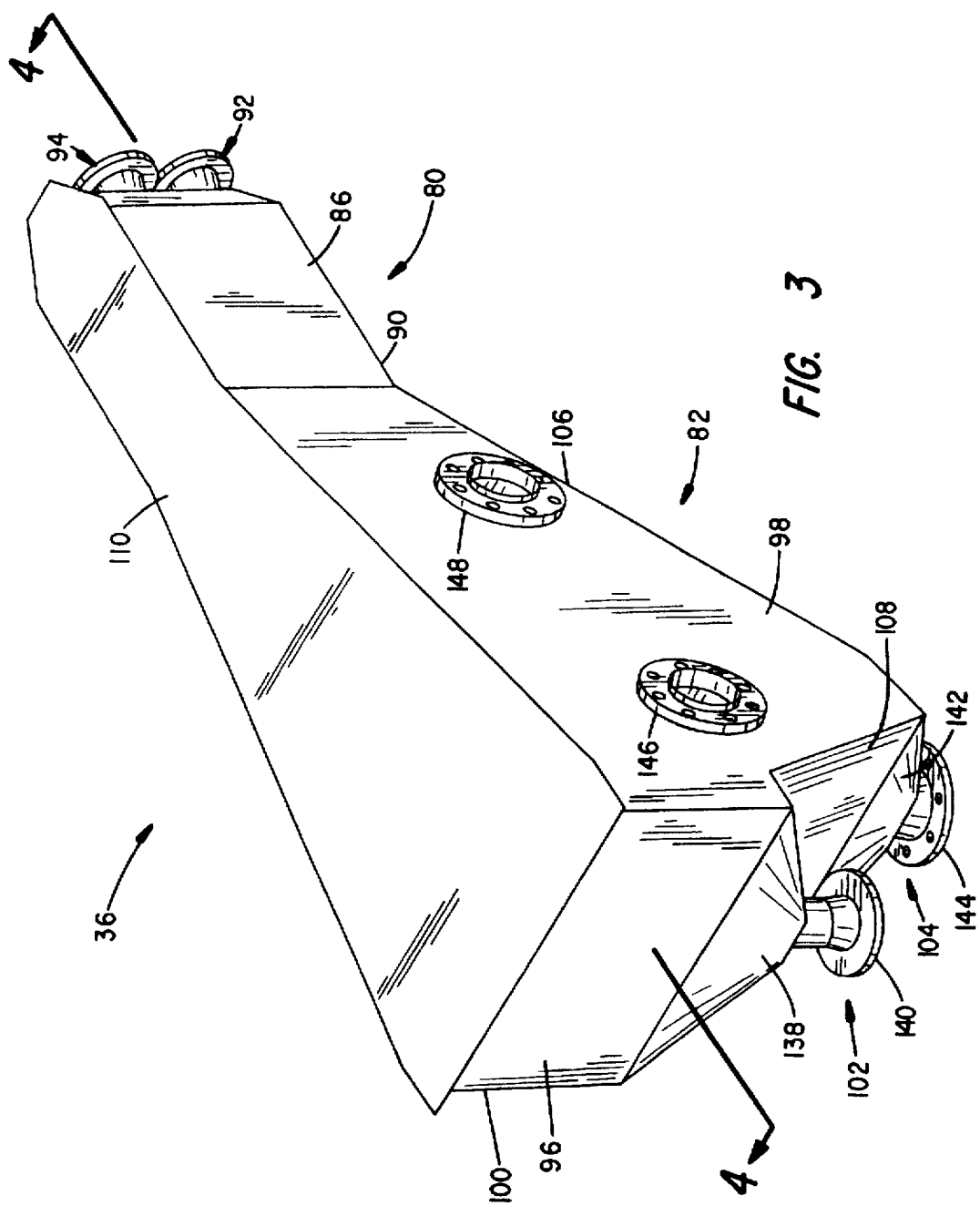
FIG. 3 is a perspective view of a segregation vessel 36 of the plastic reclamation system 24 shown in FIG. 2.
Figure 4:
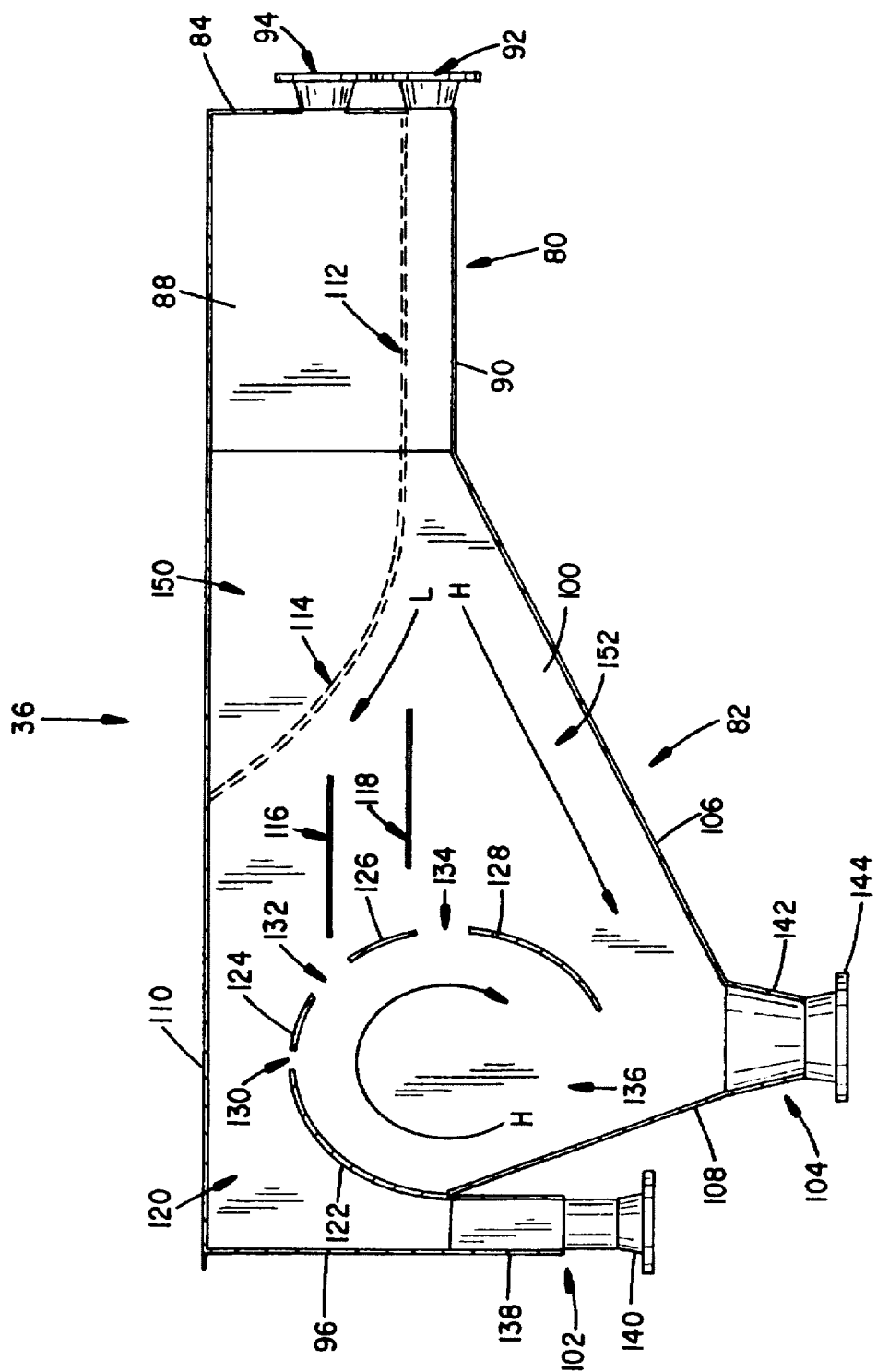
FIG. 4 is a partial sectional view of the segregation vessel 36 taken along lines 4—4 in FIG. 3.

Turning now to FIGS. 3 and 4, the segregation vessel 36 of the present invention will now be described in detail. The segregation vessel 36 forms an important aspect of the present invention in that it is capable of carrying out the segregation step 18 by exploiting the differing specific gravities of the component plastics within the slurry. The segregation vessel 36 includes a first section 80 having a generally uniform width profile and a second section 82 having a generally flared width profile. The first section 80 includes a front wall 84, a first side wall 86, a second side wall 88, a bottom member 90 extending horizontally inward from the front wall 84, a slurry inlet 92, and a flow control valve 94. Slurry formed in step 14 enters the segregation vessel 36 via slurry inlet 92. The flow control outlet 94 may be employed to controllably remove excess fluid medium from the segregation vessel 36. The second section 82 includes a rear wall 96, a first side wall 98, a second side wall 100, an upper outlet assembly 102, a lower outlet assembly 104, a first bottom member 106 extending angularly between the bottom member 90 of the first section 80 and the lower outlet assembly 104, and a second bottom member 108 extending angularly between the lower outlet assembly 104 and the upper outlet assembly 102. A top member 110 is fixedly attached to the top edges of the front wall 84, the first and second side walls 86, 88 of the first section 80, the first and second side walls 98, 100 of the second section 82, and the rear wall 96 to thereby form an enclosure within the segregation vessel 36. Within the first section 80 is a first semi-permeable screen member 112 disposed in a generally horizontal fashion in between the slurry inlet 92 and the control valve 94.

The second section 82 boasts a plurality of specially designed baffle members, including a second semi-permeable screen member 114, a pair of solid baffle members 116, 118, and a generally circular baffle assembly 120. The second semi-permeable screen member 114 extends in a generally arcuate fashion between the first semi-permeable screen member 112 of the first section 80 and the top member 110. The solid baffle members 116, 118 are generally horizontal and positioned between the second semi-permeable screen member 114 and the circular baffle assembly 120. In a preferred embodiment, the circular baffle assembly 120 includes a first curved member 122, a second curved member 124, a third curved member 126, and a fourth curved member 128. The curved members 122–128 of the circular baffle assembly 120 are preferably solid in construction and disposed in spaced relation so as to form a first aperture 130 extending between the first and second curved members 122, 124, a second aperture 132 extending between the second and third curved members 124, 126, a third aperture 134 extending between the third and fourth curved members 126, 128, and a fourth aperture 136 extending between the first and fourth curved members 122, 128. The upper outlet assembly 102 includes a collection chamber 138 and a nozzle member 140. The collection chamber 102 extends laterally between the bottom edge of the first curved member 122 and the rear wall 96 and generally downward for connection to the nozzle member 140. The lower outlet assembly 104 is constructed in similar fashion, including a collection chamber 142 and a nozzle member 144, wherein the collection chamber 142 extends laterally between the first and second bottom members 106, 108 of the second section 82 and generally downward for connection to the nozzle member 144. A first and a second viewing port 146, 148 may be provided to allow an operator to view the slurry and/or interior of the segregation vessel 36.

The first and second semi-permeable screen members 112, 114 cooperate to define a separation zone 150 and a segregation zone 152 within the segregation vessel 36. More specifically, the first and second screen members 112, 114 are fashioned to allow passage of vapor and fluid medium into the separation zone 150 while generally restricting the plastic fragments within the segregation zone 152. This effectively aids in removing air bubbles that may be attached to the plastic fragments in the incoming slurry and, moreover, biases the slurry flow such that the suspended plastic fragments will be directed towards the baffle members 116, 118 and the circular baffle assembly 120 for segregation into the heavy and light components. The segregation zone 152 encourages the plastic fragments to gravitate toward the desired outlet, i.e. light components ascending toward the upper outlet assembly 102 and heavy components descending toward the lower outlet assembly 104, by reducing the gross linear vertical flow rate of fluid medium toward each outlet 102, 104. Reducing the gross linear vertical flow rate of the fluid medium is accomplished through the cooperative action of the circular baffle assembly 120 and the baffle members 116, 118 in conjunction with the overall shape of the segregation vessel 36. The gross linear vertical flow rate may also be reduced by minimizing eddy currents within the segregation zone 152 which, for example, may be accomplished by sizing the outlets 102, 104 to have combined cross sections larger than the slurry inlet 92. The overall effect is that the residence time of the individual plastic fragments is significantly increased which, as will be appreciated, improves the desired segregation of component plastics.

In operation, the slurry enters the slurry inlet 92 and passes between the bottom member 90 and the first semi-permeable screen member 112 of the first section 80. After flowing into the second section 82, the majority of the heavier components (represented with the arrow H) within the slurry will tend to flow downwardly along the first bottom member 106, while the majority of the lighter components (represented with the arrow L) will tend to flow upwardly along the second semi-permeable screen member 114. Under this configuration, the downwardly flowing stream H of heavier components may nonetheless contain a certain amount of lighter components and, similarly, the upwardly flowing stream of lighter components L may include a certain amount of heavier components. In an important aspect of the present invention, this type of commingling between the heavier and lighter components is practically eliminated through the use of the circular baffle assembly 120 and the baffle members 116, 118. In particular, the baffle members 116, 118 provide a trimming function which combats the updraft created by the lighter components such that any heavier components therein have an increased likelihood of becoming free from the plurality of lighter components which are floating up. In addition to this trimming function, the baffle members 116, 118 also provide a solid surface for the plastic fragments to impinge upon so as to dislodge any vapor or bubbles which may be clinging to the plastic fragments.

The down flow H of heavier components progresses toward the lower outlet assembly 104 such that the bulk of the heavier components may simply come to rest within the collection chamber 142. The momentum of this flow may, however, progress past the lower outlet assembly 104 and upwardly along the second bottom member 106 so as to create a clockwise current flow (represented by the arrow H) within the circular baffle assembly 120. This clockwise flow H creates a draft within the circular baffle assembly 120 which serves to draw or pull the exteriorly disposed heavy components into the circular baffle assembly 120 via apertures 130–134. This inward draft is advantageous in that it cooperates with the baffle plates 116, 118 to recover the heavy components which may have originally been swept upward in the draft created by the lighter components. The clockwise flow H in the circular baffle assembly 120 is also advantageous in that it slows the motion of the heavy components such that they may migrate downward through the aperture 136 into the collection chamber 142 of the lower outlet assembly 104. Furthermore, the clockwise flow H within the circular baffle assembly 120 also agitates the slurry such that the lighter components are more likely to sift out from the heavier components and pass through the apertures 130–134 for subsequent migration to the upper outlet assembly 102.

Because vapors such as air may be generated and/or become entrained in the slurry during processing, the segregation vessel 36 may be further equipped with a vapor outlet (not shown) for removing any entrained vapor contained in the slurry as well as any vapor bubbles which were dislodged from the individual plastic fragments. The vapor outlet (not shown) should extend generally above the upper outlet 102 so as to remove from the vapor head spaced extending from the static fluid level to the top 110 of the segregation vessel 36. As air or other vapor entrained in the slurry may hinder segregation of the plastic fragments, the invention may incorporate a vapor trap prior to the segregation vessel 36 to reduce entrained vapor. The vapor trap may be isolated from the slurry flow by a screen or other semi-permeable boundary sized to allow the passage of vapor and fluid medium into the vapor trap while generally restricting passage of plastic fragments. Although it is desirable that the semi-permeable boundary restrict passage of all plastic fragments, passage of plastic fragments through the semi-permeable boundary does not hinder the function of the process of the present invention. Plastic fragments passing through the semi-permeable boundary may be discarded, at the expense of yield, or they may be recycled from the vapor trap into the process at any stage, preferably near the slurry inlet 92 to the segregation vessel 36. The vapor trap may further contain a chamber, relief valve or other method to accumulate or release the vapor upon separation from the slurry stream.

As with entrained vapor, vapor bubbles adhered to individual plastic fragments may also hinder the desired segregation. Imparting oscillatory energy into the fluid medium, either mechanically or sonically, may tend to dislodge any bubbles adhered to individual plastic fragments. In the preferred embodiment, sonic energy, and more preferably ultrasonic energy having a frequency of about 55 to 75 kHz, may be used to dislodge bubbles. For greater efficiencies, removal of bubbles adhered to individual plastic fragments is preferably carried out after removal of entrained air. Agitation may additionally be employed to minimize the affinity of vapor bubbles being attracted to individual plastic fragments. Agitation may include any previously described agitation method as well as sub-sonic vibration. Additionally, surface tension of the fluid medium at the upper end of the segregation vessel may tend to hold certain plastic fragments at the surface of the fluid medium despite their tendency to descend in the fluid medium. Sonic energy, and more preferably ultrasonic energy, imparted to the fluid medium may tend to reduce surface tension sufficiently to allow those plastic fragments to sink from the surface. Surfactant additives may be utilized in the slurry to further reduce surface tension.

In summary, the present invention includes a method and apparatus for reclaiming plastic wherein the mechanism for segregating the constituent plastic components is based on variations in specific gravity. Upon segregation of the plastic fragments, the concentrated light components may be removed from the upper outlet 102 of the segregation vessel 36 along with vapor, some fluid medium and, potentially, some contamination. The concentrated heavy components may similarly be removed from the lower outlet 104 of the segregation vessel 36 along with some fluid medium and, potentially, some contamination. Removal of the fluid medium and contaminants from the component plastics may be accomplished in a multitude of manners including, but not limited to, screening, filtration, oxidation, extraction, evaporation and aspiration. Following or in conjunction with removal of fluid medium, wash sprays may be incorporated to further aid in the removal of contaminants. Wash sprays may also be utilized in the removal of fluid medium if the fluid medium is of a different composition than the wash spray. The component stream may then be dried or evaporated to remove any remaining fluid medium or wash, and may then be aspirated to still further aid in the removal of contaminants. Upon removal of fluid medium, contaminants and any wash from the component stream, cleaned and segregated component plastics are available for re-use. Purities of the desired component plastics of 96% or better for light components and 99% or better for heavy components have been demonstrated with the plastic reclamation system 24 illustrated in FIG. 2.

It has additionally been demonstrated that the preferred invention is capable of removing organic and inorganic contamination contained within the plastic fragments through a leaching or degassing mechanism. Ultrapure, high-ohm heated DI water has been shown to be particularly useful at reducing levels of chloride or other ionic contaminants from plastic fragments. Increasing the residence time in the fluid medium may tend to improve the leaching or degassing mechanism. Increases in residence time may be accomplished by increasing the system volume in relation to the system output, or by reducing the system output in relation to the system volume. One common method of increasing residence time without dramatically increasing the space required for the system would be to create a piping system containing multiple switchbacks. These switchbacks will also tend to increase desirable agitation within the slurry through impingement and redirection.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

For example, it will be apparent to those skilled in the art that in processing systems of more than two component plastics, one or both component streams will contain more than one component plastic. Furthermore, it will be apparent to those skilled in the art that any component stream containing more than one component plastic could be further separated by choosing a new fluid medium whose specific gravity is chosen to effect a segregation of the component plastics in the clean component stream. The process of the present invention may then be repeated beginning with the formation of a slurry, noting however that further cleaning may be unnecessary.

Furthermore, the present invention may be carried out batchwise, but is more preferably operated as a continuous process. As continuous processes are more complex, the preferred embodiment has described one such continuous process. It will be readily apparent to those skilled in the art that analogous processing can be carried out in batch operations.

Moreover, although the baffle structures in FIGS. 3 and 4 divert flow primarily vertically rather than laterally, it is to be understood that such lateral flow diversions may be additionally employed without departing from the scope of the present invention.

The segregation vessel 36 may also take any number of different shapes without departing from the scope of the present invention. For example, the segregation vessel 36 may have a cylindrical shape, an hour-glass shape, a pyramidal shape, a conical shape, or any other shape or configuration substantially in conformance with the above recommendations, i.e. such that light components concentrate near the upper outlet 56 and heavy components concentrate near the lower outlet 58.

What is claimed is:

1. A method of reclaiming plastic from plastic articles, comprising the steps of:
    (a) fragmenting plastic articles to produce a plurality of plastic fragments, each plastic fragment consisting essentially of one of a heavy component plastic and a light component plastic;
    (b) sizing said plurality of plastic fragments so as to remove plastic fragments which do not comport to said preferred dimension;
    (c) adding a fluid medium to said plurality of plastic fragments to produce a slurry;
    (d) loosening contamination from said plurality of plastic fragments;
    (e) segregating said heavy and light plastic components within said slurry based on specific gravity by:
        (1) providing a segregation vessel including a first section having a substantially uniform width profile and a second section having a flared width profile, said first section including a slurry inlet and a semi-permeable member disposed above said slurry inlet, said second section including a first bottom member extending angularly between said first section and a lower outlet, a second bottom member extending angularly between said lower outlet and an upper outlet, a semi-permeable member extending from said semi-permeable member of said first section, a substantially circular baffle assembly disposed superior to said lower outlet, and at least one solid baffle member disposed between said semi-permeable member and said circular baffle assembly, said semi-permeable members of said first and second sections cooperating to define a separation zone and a segregation zone such that vapor and fluid medium is allowed to flow into said separation zone while said plurality of plastic fragments are restricted within said segregation zone, said segregation zone serving to reduce the gross linear vertical flow are of fluid medium toward said upper and lower outlet;
        (2) injecting said slurry into said slurry inlet;
        (3) allowing said heavy plastic components to migrate toward said lower outlet; and
        (4) allowing said light plastic components to migrate toward said upper outlet.

2. The method as set forth in claim 1 and further, step (b) including the further sub-step of removing fines from said plurality of plastic fragments.

3. The method as set forth in claim 1 and further, step (c) including the further sub-step of providing said fluid medium as having a specific gravity which is greater than the specific gravity of said light plastic components and generally less than the specific gravity of said heavy plastic components.

4. The method as set forth in claim 1 and further, step (d) including t he further sub-step of heating one of said fluid medium and said slurry.

5. The method as set forth in claim 1 and further, step (d) including the further sub-step of applying sonic energy to said slurry.

6. The method as set forth in claim 1 and further, step (d) including the further sub-steps of:

(i) applying at least one of sonic energy and ultrasonic energy to said slurry; and (ii) splitting said slurry into streams and selectively impacting said streams.

7. An apparatus for reclaiming plastic, comprising:

(a) a means for sizing a plurality of fragmented plastic articles such that each of said plurality of fragmented plastic articles falls within a predetermined range of sizes;

(b) means for supplying a fluid medium to said plurality of fragmented plastic articles to produce a slurry;

(c) means for loosening contamination from said fragmented plastic articles within said slurry;

(d) segregation means for segregating said fragmented plastic articles within said slurry into heavy plastic components having heavy specific gravities and light plastic components having light specific gravities, said segregation means including a first section and a second section, said first section having a slurry inlet and a semi-permeable member disposed above said slurry inlet, said second section having a lower outlet, an upper outlet, a semi-permeable member extending from said semi-permeable member of said first section, a baffle assembly disposed superior to said lower outlet, and at least one solid baffle member between said semi-permeable member and said circular baffle assembly, said semi-permeable members of said first and second sections cooperating to define a separation zone and a segregation zone such that vapor and fluid medium are allowed to flow into said separation zone while said plurality of fragmented plastic articles are generally restricted within said segregation zone, said segregation zone serving to reduce the gross linear vertical flow rate of fluid medium toward said upper and lower outlet; and (e) cleaning means coupled to said segregation means for cleaning said fragmented plastic articles after segregation by said segregation means.

8. The apparatus as set forth in claim 7 and further, said means for sizing including an air aspirator, means for transporting said plurality of fragmented plastic articles to said air aspirator, means for removing fines from said plurality of fragmented plastic articles, and a vibration table for eliminating non-conforming fragmented plastic articles from said plurality of fragmented plastic articles.

9. The apparatus as set forth in claim 8 and further, said means for loosening contamination including a switchback pipe assembly for agitating said slurry and sonic energy means for imparting sonic energy into said slurry.

10. The apparatus as set forth in claim 9 and further, said cleaning means including rinsing means for rinsing said plurality of heavy plastic components and light plastic components segregated by said segregation means, drying means for drying said heavy plastic components and light plastic components after passing through said rinsing means, and air aspiration means for removing gases from said heavy plastic components and light plastic components after passing through said drying means.

11. An improved segregation vessel for use in plastic reclamation, comprising:

a first section having a slurry inlet and a semi-permeable member disposed above said slurry inlet; and a second section having a lower outlet, an upper outlet, a semi-permeable member extending from said semi-permeable member of said first section, a generally circular baffle assembly disposed generally superior to said lower outlet, and at least one solid baffle member disposed between said semi-permeable member and said circular baffle assembly, whereby said semi-permeable members of said first and second sections cooperate to define a separation zone and a segregation zone such that vapor and fluid medium is allowed to flow into said separation zone while said plurality of plastic fragments are generally restricted within said segregation zone, and said segregation zone serves to reduce the gross linear vertical flow rate of fluid medium toward said upper and lower outlet.

* * * * *

UNITED STATES PATENT AND TRADEMARK OFFICE
CERTIFICATE OF CORRECTION

PATENT NO. : 5,894,996
DATED : April 20, 1999
INVENTOR(S) : John D. Williams

It is certified that error appears in the above-indentified patent and that said Letters Patent is hereby corrected as shown below:

Claim 11, column 14, line 29 delete "generally";
    line 30 delete "circular".

Signed and Sealed this

Sixth Day of June, 2000

Attest:

Q. TODD DICKINSON

*Attesting Officer*        *Director of Patents and Trademarks*